United States Patent [19]

Hori et al.

[11] Patent Number: 4,660,290

[45] Date of Patent: Apr. 28, 1987

[54] INCLINATION MEASURING INSTRUMENT

[75] Inventors: Nobuo Hori, Tokyo; Takashi Yokokura, Hino; Fumio Ohtomo, Kawagoe, all of Japan

[73] Assignee: Tokyo Kagaku Kikai Kabushiki Kaisha, Tokyo, Japan

[21] Appl. No.: 808,044

[22] Filed: Dec. 12, 1985

[30] Foreign Application Priority Data

Dec. 21, 1984 [JP] Japan ................................ 59-270462

[51] Int. Cl.⁴ ........................... G01C 9/06; G01C 9/26
[52] U.S. Cl. ......................................... 33/366; 33/379
[58] Field of Search ................... 33/366, 379; 340/689

[56] References Cited

U.S. PATENT DOCUMENTS

| 3,096,591 | 7/1963 | Higgins, Jr. et al. | 33/366 |
| 4,077,132 | 3/1978 | Erickson | 33/366 |
| 4,536,967 | 8/1985 | Beitzer | 33/379 |

FOREIGN PATENT DOCUMENTS 53-59461 5/1978 Japan .

| WO83/01304 | 4/1983 | PCT Int'l Appl. | 33/366 |
| 756199 | 8/1980 | U.S.S.R. | 33/366 |
| 767507 | 9/1980 | U.S.S.R. | 33/366 |

*Primary Examiner*—Richard R. Stearns
*Attorney, Agent, or Firm*—Brumbaugh, Graves, Donohue & Raymond

[57] ABSTRACT

Inclination measuring instrument having a tube having a concave inside surface and filled with liquid so as to have a bubble, a first electrode provided on the outside surface of the tube opposite to the bubble, second and third electrodes provided on the outside surface of the tube opposite to the first electrode and located along the direction of shift of the bubble, a guard electrode provided on the outside surface of the tube to frame the first, second and third electrodes and to be supplied with a predetermined voltage, and processing means for connecting a first capacitor consisting of the first and second electrodes and second capacitor consisting of the first and third electrodes so as to calculate the inclination of the tube from the output of the first and second capacitors.

4 Claims, 13 Drawing Figures

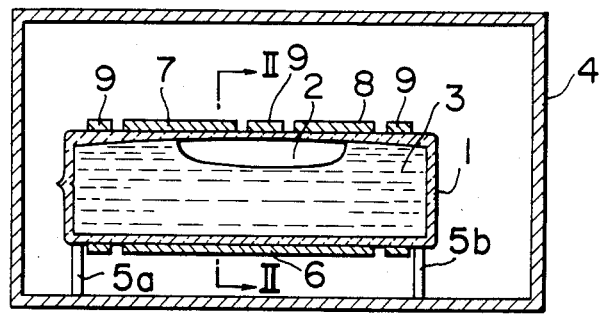
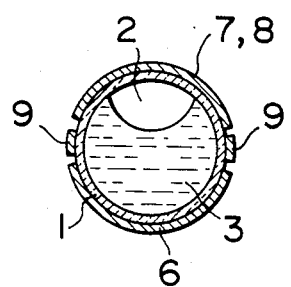
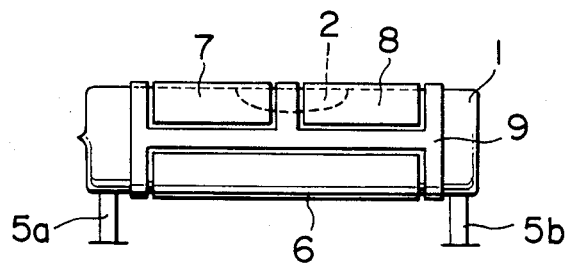

FIG. 4
(a)
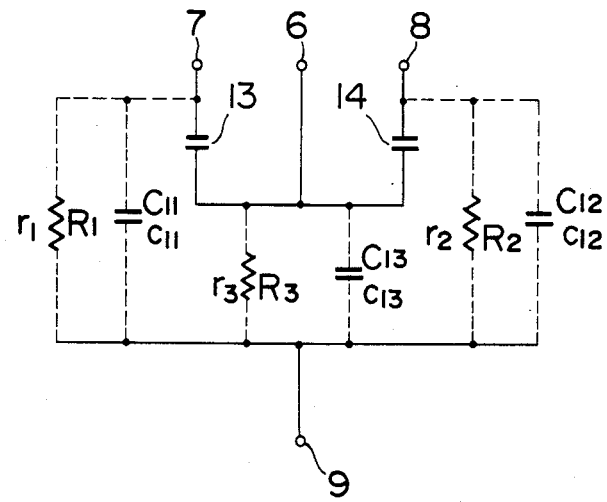
(b)
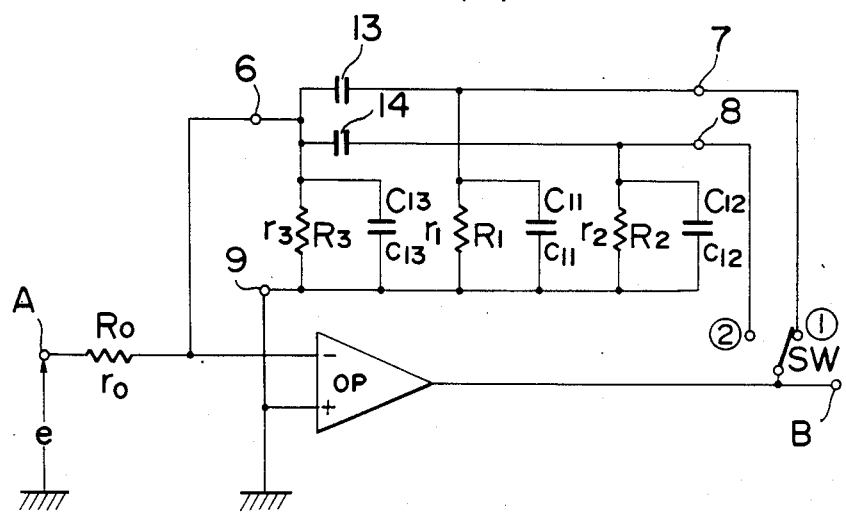

INCLINATION MEASURING INSTRUMENT

BACKGROUND OF THE INVENTION

Field of the Invention

The present invention relates to an inclination measuring instrument. More specifically, the present invention pertains to an instrument in which a pair of electrodes are located on opposite side surfaces of a spirit level, and the electrodes detect changes in electrostatic capacity between the electrodes caused by the shift of the bubble, the inclination of the glass tube being calculated from said changes.

There is known a spirit level in which the upper inside surface of a glass tube is formed toricly and the amount of shift of a bubble therein is read out through a scale provided on the tube so as to measure the inclination of the ground or a horizontal portion of a structure.

There is also known, as shown in Japanese Patent Disclosure No. 53-59461, an electrostatic capacity system apparatus for measuring inclination, which detects the inclination as an electric signal. The apparatus, as shown in FIG. 7, has a common electrode 81 placed on a lower surface of a tube 80 and two electrodes 82, 84 located on the upper surface of the tube 20 in line with the direction of movement of a bubble 2, so that first and second capacitors are formed by the electrodes 81, 82 and the electrodes 81, 84, respectively. These capacitors are connected with an alternating current bridge circuit, and when the bubble 2 is shifted by changes in the inclination, the inclination is indicated as a differential voltage output of the bridge circuit.

It should, however, be noted that in the conventional apparatus the electrodes are located close to one another, and that consequently resistance and stray capacity form in the capacitors. The resistance and the stray capacity are easily affected by ambient conditions, for example temperature, so that it is impossible to precisely carry out the measurement of inclination thereby.

OBJECT OF THE INVENTION

It is therefore an object of the present invention to provide an inclination measuring instrument in which the resistance and the stray capacity between the electrodes do not influence the electrical detection of bubble shift in a spirit level, so that the measurement of inclination is carried out precisely.

SUMMARY OF THE INVENTION

According to the present invention, the above and other objects can be accomplished by inclination measuring instrument having a tube having a curved inside surface and filled with liquid so as to have a bubble, a first electrode provided on the outside surface of the tube opposite to the bubble, second and third electrodes provided on the outside surface of the tube opposite to the first electrode and located along the direction of shift of the bubble, a guard electrode provided on the outside surface of the tube to frame the first, second and third electrodes and to be supplied with a predetermined voltage, and processing means for connecting a first capacitor consisting of the first and second electrodes and second capacitor consisting of the first and third electrodes so as to calculate the inclination of the tube from the output of the first and second capacitors.

In a preferable aspect of the present invention, said processing means has an integral circuit connected alternatively with the first and second capacitors, a square wave converter for converting the output of the integral circuit into a square wave, a counter for counting the output of the converter, and means for calculating the inclination from the output of the counter.

According to a specific aspect of the present invention, there is provided an inclination measuring apparatus in which either the first electrode or the second and third electrodes are provided on the upper surface of the tube, and the other is provided on the lower surface of the tube.

In a preferable aspect of the present invention, in which the first, second and third electrodes are provided on the side surface of the tube.

The above and other objects and features of the present invention will become apparent from the following description of preferred embodiments with reference to the accompanying drawings.

BRIEF DESCRIPTION OF THE DRAWINGS

FIG. 1 is a vertical sectional view showing the electrostatic capacity detector in accordance with one embodiment of the present invention;

FIG. 2 is a vertical sectional view along the line II—II indicated in FIG. 1;

FIG. 3 is a side view of the embodiment shown in FIG. 1;

FIG. 4(a) is a circuit diagram equivalent to the detector shown in FIG. 1;

FIG. 4(b) is an integral circuit diagram including the circuit shown in FIG. 4(a);

DESCRIPTION OF THE PREFERRED EMBODIMENT

Figure 5:
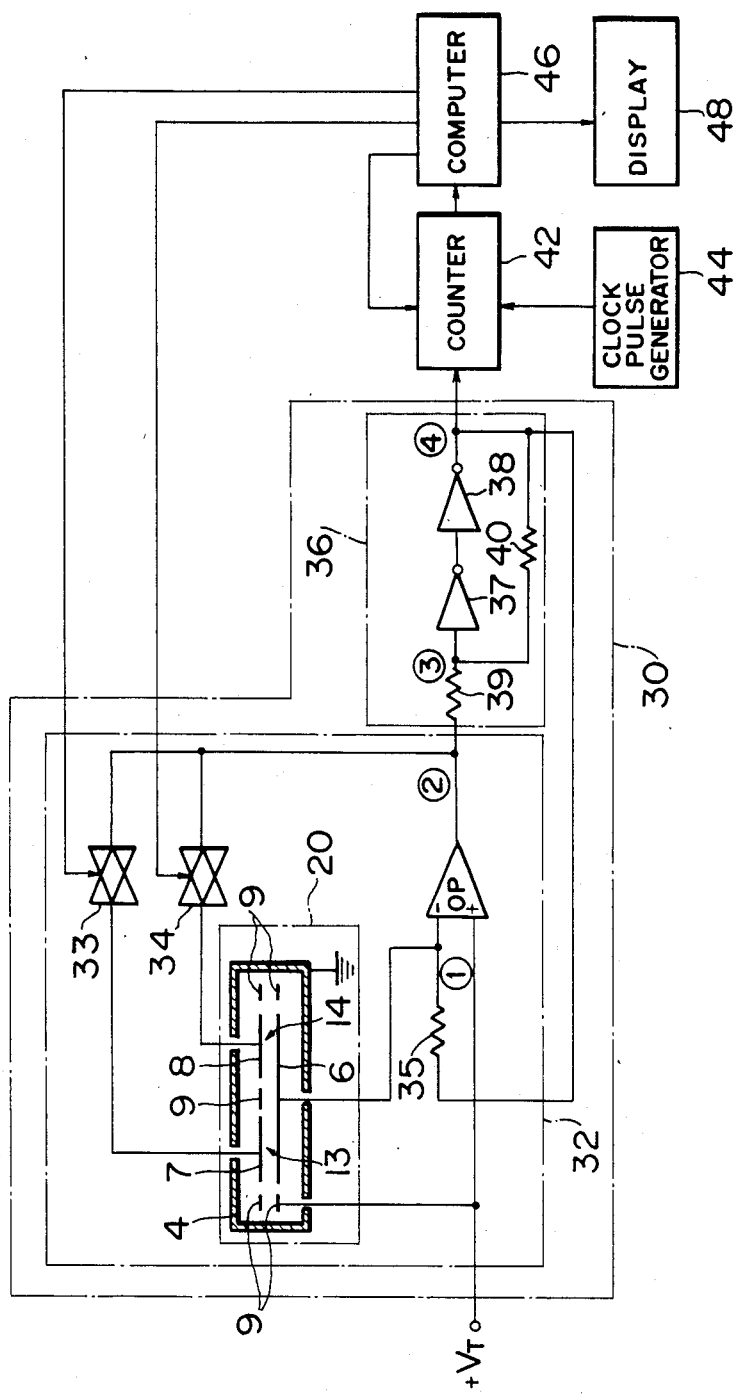
FIG. 5 is a block diagram of an inclination measuring apparatus having the detector shown in FIG. 1.

Referring now to the drawings, there is shown an inclination measuring instrument in which the present invention is embodied. The apparatus shown in FIG. 1 includes a spirit level having a tube 1 made of an electrical insulating such as glass. The tube 1 is partially filled with a liquid of low viscosity so as to form a bubble. The tube 1 is provided with a curved surface, for example, toric or concave, at its inner upper portion, and is supported by supporting members 5a, 5b in a sealed case 4. There are provided a first electrode 6 that is about two-third the length of the tube 1 and which covers an area of the lower surface of about 170°, and second and third electrodes 7, 8 which are one-third the length of the tube and respectively about 170° the upper surface. The second and third electrodes 7, 8 are longitudinally spaced from each other. The first, second and third electrodes 6, 7, 8 are framed by a guard electrode 9 which prevents leak current and stray capacity from being generated between the electrodes 6, 7, 8, so that the stray capacities between the first, second and third electrodes 6, 7, 8 are substantially zero.

Although there is generated leak current and stray capacity between the guard electrode 9 and each of the electrodes 6, 7, 8, such leak current and stray capacity are too small to influence measurement.

FIG. 4(a) shows a capacity detecting circuit equivalent to the one adopted in the embodiment, in which "$r_1$, $r_2$ and $r_3$" designate the resistance values between the guard electrode 9 and the electrodes 6, 7, 8, respectively. "$R_1$, $R_2$ and $R_3$" designate resistors equivalent to those between the electrode 9 and the electrodes 6, 7, 8, respectively. "$c_{11}$, $c_{12}$ and $c_{13}$" designate stray capacity values between the guard electrode 9 and the electrodes 6, 7, 8, respectively. "$C_{11}$, $C_{12}$ and $C_{13}$" designate assumed capacitor between the guard electrode 9 and the electrodes 6, 7, 8, respectively.

Reference numeral 13 denotes a capacitor constituted by the electrodes 6, 7, and reference numeral 14 denotes a capacitor constituted by the electrode 6, 8.

In order to eliminate the adverse affect of the resistance values $r_1$, $r_2$, $r_3$ and the capacity values $c_{11}$, $c_{12}$, $c_{13}$ on measurements, the angle of inclination is measured by detecting the change in the charge current between the electrodes 6, 8 and the electrodes 6, 7, while the electrodes 6, 9 have the same voltage. Therefore, there is no current between the electrodes 6 and 9, and all of the current from the electrode 6 is used for charging the capacitors 13, 14.

FIG. 4(b) shows an integrating circuit for measuring the current for charging the capacitors 13, 14. At the begining the capacitors 13, 14 are not charged. A switch SW is switched to a terminal ① and a terminal A is supplied with a voltage e for a predetermined period, then the switch SW is switched to a terminal ② and the input terminal A is supplied with voltage e for the same period.

When the switch SW is switched to the terminals ① (②), the voltage at a terminal B corresponds to the amount of charge of the capacitors 13 (14). The electrodes 6, 9 are kept at the same voltage by an operational amplifier OP, so that the current does not flow into the resistor $R_3$ and the capacitor $C_{13}$.

Thus, current $e/r_o$ flowing from the terminal A is supplied to the capacitor 13 or 14 connected with the terminal A via the switch SW. The current is supplied to the resistors $R_1$, $R_2$ and the capacitors $C_{11}$, $C_{12}$, but it does not influence the voltage of the terminal B because the output impedance of the operational amplifier OP is sufficiently small compared with the above-mentioned impedance of $R_1$, $R_2$, $C_{11}$, $C_{12}$.

In FIG. 5 there is shown a block diagram of the inclination measuring instrument in which the present invention is embodied. The instrument has a static capacity detecting block 20 and a processing block. The processing block includes an oscillator 30, a counter 42, a clock pulse generator 44, a computer 46 for controlling analogue switches 33, 34 in the oscillator 30 and calculating inclination in accordance with the output from the oscillator 30, and a display 48 for showing the output, namely the angle of inclination, of the computer 46.

The oscillator 30 comprises an integral circuit 32 and a Schmidt trigger circuit 36. The integral circuit 32 has the capacitors 13, 14 in the block 20, analogue switches 33, 34, the operational amplifier OP, and a resistor 36. The positive terminal of the operational amplifier OP is supplied with a voltage equal to the threshold voltage $V_T$ (shown in FIG. 6 ①) of the circuit 36 as a standard voltage (grounded voltage as shown in FIG. 4(b)), and the negative terminal is connected with a resistor 35 and the capacitor 13, 14 so that the operational amplifier OP integrates the voltage supplied to the resistor 35.

Figure 6:
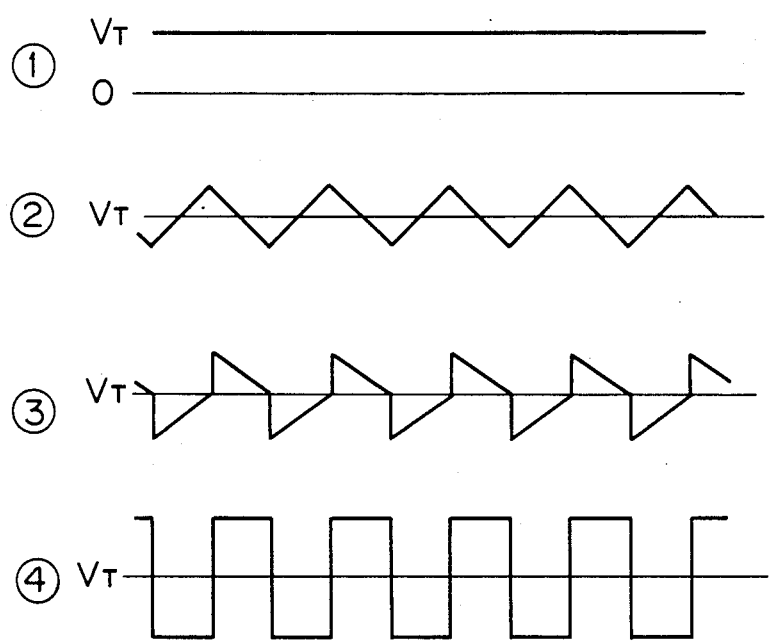
FIG. 6 is a wave form chart corresponding to the block diagram shown in FIG. 5.
Figure 7:
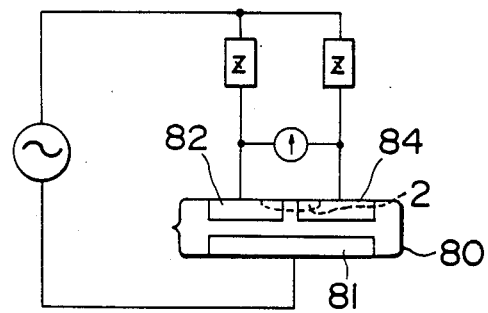
FIG. 7 is an explanatory view of the conventional inclination measuring apparatus.
Figure 8:
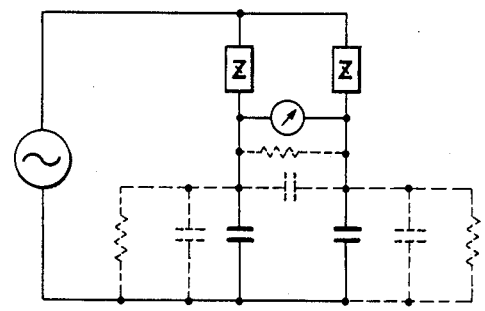
FIG. 8 is a circuit equivalent to the apparatus shown in FIG. 7.

The operational amplifier OP is controlled by the computer 46 so as to integrate the capacity of the capacitor 13 or 14 selected by the analogue switches 33, 34. The output of the operational amplifier OP is shown in FIG. 6 ②. The guard electrode 9 is connected with the positive input of the amplifier OP to be supplied a stable standard voltage.

The Schmidt trigger circuit 36 includes a resistor 39 and inverters 37, 38, which are connected in series, and the output terminal of the inverter 38 is connected with the input terminal of the inverter 37 through the resistor 40. Thereby, the output voltage of the integral circuit 32 is divided by the resistors 39, 40 and supplied to the inverter 37. When the input voltage of the inverter 37, as shown in FIG. 6 ③, coincides with the threshold voltage $V_T$, its output is converted and the output voltage of the inverter 38, as shown in FIG. 6 ④, is converted.

The output cycle of the oscilator 30, as shown in FIG. 6 ④, is adapted to be obtained from the formula $T = k_1 \times r_1 \times c$, and therefore the cycle T is proportional to the capacity C of the capacitor connected with the oscillator 30. $k_1$ designates a constant number and $r_1$ designates the resistance of the resistor 35.

The clock pulse generator 44 generates clock pulses having a shorter cycle than the output cycle T of the oscillator 30, for supplying them to the counter 42. The counter 42 counts clock pulses produced by the generator 44, over a period during which a predetermined $\alpha$ pulses, for example, 256 pulses, are supplied from the oscillator 30. The counter 42 calculated the counts $N_1$, $N_2$ in proportion to the capacity of the capacitor 13 or 14 which is selected by the analogue switches 33, 34, and the counter 42 generates count signals and resets itself in response to signals, for changing over the analogue switches 33, 34, which are supplied from a computer 46. The counts $N_1$, $N_2$ are transferred to the computer 46.

The computer 46 calculates the inclination $\theta$ from the counts $N_1$, $N_2$. When the inclination $\theta$ is zero, it is assumed that c indicates the capacity of the capacitors 13, 14, $\beta_o$ designates a proportional constant, $T_1$ designates the output cycle of the oscillator 30 connected with the capacitor 13, and $T_2$ designates the output cycle of the oscillator 30 connected with the capacitor 14.

In the measurement, the capacities of the capacitors 13, 14 are $c_1$ and $c_2$, respectively. The counter 42 calculates the output of the oscillator 30 having the cycles $T_1$, $T_2$ to obtain the counts $N_1$, $N_2$ respectively, according to the formulas:

$$N_1 = \alpha \frac{T_1}{T_o} = \frac{\alpha K r_1}{T_o} c_1 = \frac{\alpha K r_1}{T_o} (\beta_o \theta + c) \quad (1)$$

$$N_2 = \alpha \frac{T_2}{T_o} = \frac{\alpha K r_1}{T_o} c_2 = \frac{\alpha K r_1}{T_o} (-\beta_o \theta + c) \quad (1)$$

The inclination $\theta$ can then be computed as:

$$\theta = \frac{T_o}{2\alpha K r_1 \beta_o} (N_1 - N_2) \quad (3)$$

The computer 46 calculates the formula (3) to obtain the inclination $\theta$ and supplies it to the display 48. The computer 46 also supplies control signals to the analogue switches 33, 34 and timing signals for output and reset to the counter 42. The display 48 digitally indicates the inclination $\theta$.

In the aforementioned embodiment currents arising from the resistance and the stray capacity between the electrodes 6 and 7, between the electrodes 7 and 8, and between the electrodes 6 and 8 are greatly reduced, because of the provision of the guard electrode 9 between the electrodes 6, 7, 8. On the other hand, there may be newly generated resistance and stray capacity between the electrodes 6 and 9, between the electrodes 7 and 9, and between the electrodes 8 and 9. However, the potential between the electrodes 6, 9 is kept at zero by the provision of the operational amplifier OP, so that no current is generated between them, and the measurement is not affected thereby. The resistance and the stray capacity between the electrodes 7 and 9 and between the electrodes 8 and 9 scarcely affect the measurement, because the output impedance of the operational amplifier OP is extremely low.

Figure 9:
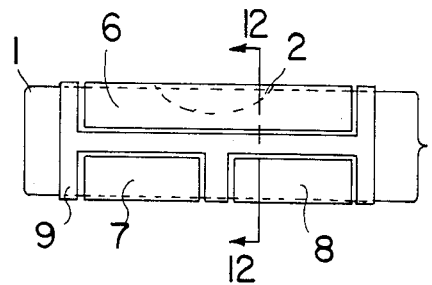
FIG. 9 is a side view of an alternative embodiment of FIG. 1.
Figure 10:
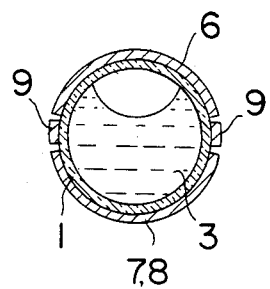
FIG. 10 is a vertical sectional view along the line 12—12 indicated in FIG. 9.
Figure 11:
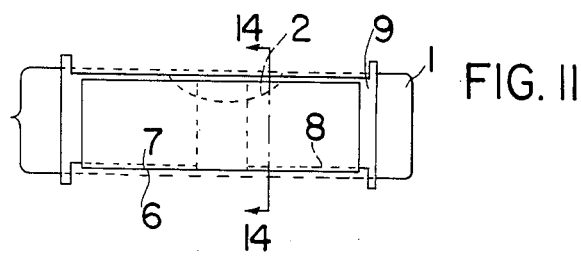
FIG. 11 is a side view of an alternative embodiment of FIG. 1.
Figure 12:
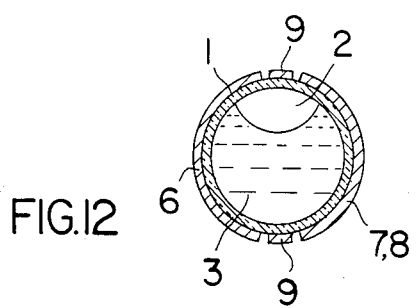
FIG. 12 is a vertical sectional view along the line 14—14 indicated in FIG. 11.

In the aforementioned embodiment the electrodes 6, 7, 8 are located on the upper and lower surfaces of the tube 1. Referring to FIG. 9, there is shown an alternative embodiment wherein the first electrode is displaced on the top surface of the tube and the second and third electrodes are displaced on the bottom surface thereof. It is also possible to realize the present invention by positioning the electrodes 6, 7, 8 on the side surfaces thereby so that the bubble 2 is positioned between them, as shown in FIGS. 11 and 12.

The electrode 6 mentioned above is formed as a single one, but it may be formed as two electrodes in correspondence to the electrodes 7, 8.

In an other embodiment, it is permissible for there to be some voltage between the electrodes 6 and 9 insofar as the resistance and the stray capacity between them do not influence the measurement.

It should be understood that while the invention has been described with respect to preferred embodiments, variations may be perceived by those skilled in the art without departing from the scope of the present invention as described by the claims appended hereto.

We claim:

1. Inclination measuring instrument having a tube having a curved inside surface and filled with liquid so as to have a bubble, a first electrode provided on the outside surface of the tube opposite to the bubble, second and third electrodes provided on the outside surface of the tube opposite to the first electrode and located along the direction of shift of the bubble, a guard electrode provided on the outside surface of the tube to frame the first, second and third electrodes and to be supplied with a predetermined voltage, and processing means for connecting a first capacitor consisting of the first and second electrodes and second capacitor consisting of the first and third electrodes so as to calculate the inclination of the tube from the output of the first and second capacitors.

2. Inclination measuring apparatus in accordance with claim 1 in which said processing means has an integral circuit connected alternatively with the first and second capacitors, a square wave converter for converting the output of the integral circuit into a square wave, a counter for counting the output of the converter, and means for calculating the inclination from the output of the counter.

3. Inclination measuring apparatus in accordance with claim 1 in which one of (1) the first electrode and (2) the second and third electrodes are provided on the upper surface of the tube, and the other is provided on the lower surface of the tube.

4. Inclination measuring apparatus comprising a tube having a curved inside surface and filled with liquid so as to have a bubble adjacent the upper surface of said tube, a first electrode provided on the outer side surface of said tube, second and third electrodes provided on the outer side surface of the tube opposite said first electrode, a guard electrode provided on the outside surface of the tube to frame the first, second and third electrodes and to be supplied with a predetermined voltage, and processing means for connecting a first capacitor consisting of the first and second electrodes and a second capacitor consisting of the first and third electrodes so as to calculate the inclination of the tube from the output of the first and second capacitors.

* * * * *